United States Patent
Yokoyama et al.

[11] Patent Number: 5,910,335
[45] Date of Patent: Jun. 8, 1999

[54] PRODUCT BONDED WITH RESIN PAINT AND THE PROCESS OF BONDING

[75] Inventors: Teruyoshi Yokoyama, Chita; Hisashi Watanabe, Gifu, both of Japan

[73] Assignee: Daido Tokushuko Kabushiki Kaisha, Aichi, Japan

[21] Appl. No.: 08/848,347

[22] Filed: Apr. 30, 1997

Related U.S. Application Data

[63] Continuation of application No. 08/438,236, May 9, 1995, abandoned.

[51] Int. Cl.$^6$ .................................................. B05D 3/02
[52] U.S. Cl. .................. 427/127; 427/208; 427/208.2; 427/209; 427/372.2; 427/386; 106/14.05; 428/414; 428/416; 428/460; 428/461; 428/500; 428/692; 525/523
[58] Field of Search .................... 428/414, 416, 428/900, 460, 461, 500, 692; 525/523; 427/487, 127, 208, 208.2, 209, 372.2, 386; 106/14.05

[56] References Cited

U.S. PATENT DOCUMENTS

| | | | |
|---|---|---|---|
| 3,962,520 | 6/1976 | Watanabe et al. | 428/901 |
| 4,396,659 | 8/1983 | Shibata et al. | 428/900 |
| 4,710,424 | 12/1987 | Bandara et al. | 428/328 |
| 4,935,080 | 6/1990 | Hassell et al. | 156/154 |
| 5,089,101 | 2/1992 | Hayashi et al. | 204/181.7 |
| 5,147,730 | 9/1992 | Ogishi et al. | 428/623 |
| 5,153,053 | 10/1992 | Hashimoto et al. | 428/329 |
| 5,401,782 | 3/1995 | Kawakami et al. | 523/415 |

FOREIGN PATENT DOCUMENTS

| | | |
|---|---|---|
| 2907806 | 1/1980 | Germany. |
| 47-018987 | 5/1972 | Japan. |
| 63-120786 | 5/1988 | Japan. |
| 1-242675 | 9/1989 | Japan. |
| 2-233745 | 9/1990 | Japan. |
| 1271163 | 4/1972 | United Kingdom. |

OTHER PUBLICATIONS

Hawley's Chemical Dictionary, 12th edition, p. 866 1993.
Lee et al, Handbook of Epoxy Resins, McGraw Hill Pub., Chapter 21 1982 RI.
Russian Journal, 94:66831 CA, Kayun et al., "Use of laminated . . . equipment" 1980.
US Journal, 109:39039 CA, Anon., Rapid Curing of Adhesives . . . heating 1988.

*Primary Examiner*—Randy Gulakowski
*Attorney, Agent, or Firm*—Koda & Androlia

[57] ABSTRACT

A product comprising two or more parts which are made of a metallic material having different characteristics bonded with a resin paint. The two or more parts are brought into contact and held together by the adhesive property of the resin. The two or more parts are then bonded together by baking the two or more parts with resin paint applied thereto.

5 Claims, 6 Drawing Sheets

(a)

(b)

(a)

(b)

PRODUCT BONDED WITH RESIN PAINT AND THE PROCESS OF BONDING this application is a continuation of application Ser. No. 08/438,236, filed May 9, 1995, now abandoned.

FIELD OF THE INVENTION

The present invention relates to the product bonded with resin paint and to the process of bonding.

BACKGROUND OF THE INVENTION

Among various products for industry and for living, there are some products comprising two or more parts, at least, one of which is applied with decorative or anti-corrosive paint by baking, and which parts are assembled together by bonding with adhesive. FIG. 8, for instance, schematically shows the assembling process of the rotor for a stepping motor. The rotor 10 comprises a ring 12 made of magnetic material such as neodymium-iron-boron (Nd-Fe-B), and a boss 14 made of nonmagnetic metal (SUS304, aluminum, etc.) which is inserted into the ring 12. In this case, the surface of the ring 12 as is magnetic material is apt to rust and is poor-looking, so that it is treated by painting prior to being assembled with the boss 14. That is, as shown in FIG. 8 (1), the surface of the ring 12 is applied with anti-corrosive paint 16 by electrodepositioning paint or spray painting, treated by baking in the heating furnace 18 (electric furnace, gas furnace, etc.) as shown in FIG. 8 (2), and thereafter appropriate adhesive 20 is applied to the inner periphery of the ring 12, as shown in FIG. 8 (3). Then, the boss 14 is inserted into this ring 12 so that the bonded assembly of both members 12, 14 is obtained.

Further, FIG. 9 (1) is a perspective view showing arc pieces of segment magnets 24 bonded at predetermined intervals peripherally to the inner surface of cylindrical yoke 22 in a motor housing, for instance. In this case, also, the surface of each piece of the segment magnets 24 is applied with the anti-corrosive paint 16 by the electrodepositioning painting, etc., treated by baking in the heating furnace, and then bonded to the inner surface of the yoke 22 through the adhesive applied on the baked paint.

In the above-mentioned product for industry or for living that comprises tow or more parts, at least, one of the parts is applied with the paint and thereafter those parts are bonded together to be assembled, so that a separate process is required for applying the adhesive after the completion of the painting. Consequently, it is unavoidable for the manufacturing cost to be increased owing to the increase of numbers of processes and to the use of the adhesive. Furthermore, the adhesive contains a fear that is protrudes from the product as the object of bonding and impairs the dimensional tolerance or results in poor-looking. Moreover, the adhesive contains a problem that the volatile solvent included in itself is vaporized to render the working environment polluted. Furthermore, such fault is pointed out that when the single part to be painted is treated by electrodepositioning painting or spray painting, and thereafter treated by baking, the part easily deforms or produces a strain so that the desired accuracy of the assembled product can not be secured.

OBJECT OF THE INVENTION

The present invention relates to various products for industry and for living comprising two or more parts, at least, one of which is treated by painting and which the parts are thereafter bonded to be assembled, and (1) an object of the invention is to provide means that helps to lower the cost of production by avoiding the process of applying the adhesive and the use of the same. (2) Another object of the invention is to provide means that solves the poor-looking due to protruding of the adhesive and also improves the working environment. (3) A further object of the invention is to provide means that can secure the accuracy in assembling the product by solving the deformation or strain of the product.

SUMMARY OF THE INVENTION

In order to solve the above-mentioned problems and to accomplish the desired objects preferably, the product according to the present invention comprises tow or more parts bonded with resin paint, characterized in that said parts are brought into contact with each other through said resin paint having adhesive property, and said resin paint is treated by baking so that said parts may be bonded together.

Also, in order to solve the above-described problems and to accomplish the desired objects preferably, the process of bonding tow or more parts with resin paint according to another invention of the present application comprises the steps of: applying said resin paint having adhesive property to, at least, one of two or more parts to be bonded together, assembling said painted part and other part or parts in contact with each other, and baking said assembled parts so that the contact portions between said parts may be bonded by adhesion of the paint.

DETAILED DESCRIPTION OF THE INVENTION

Figure 1:
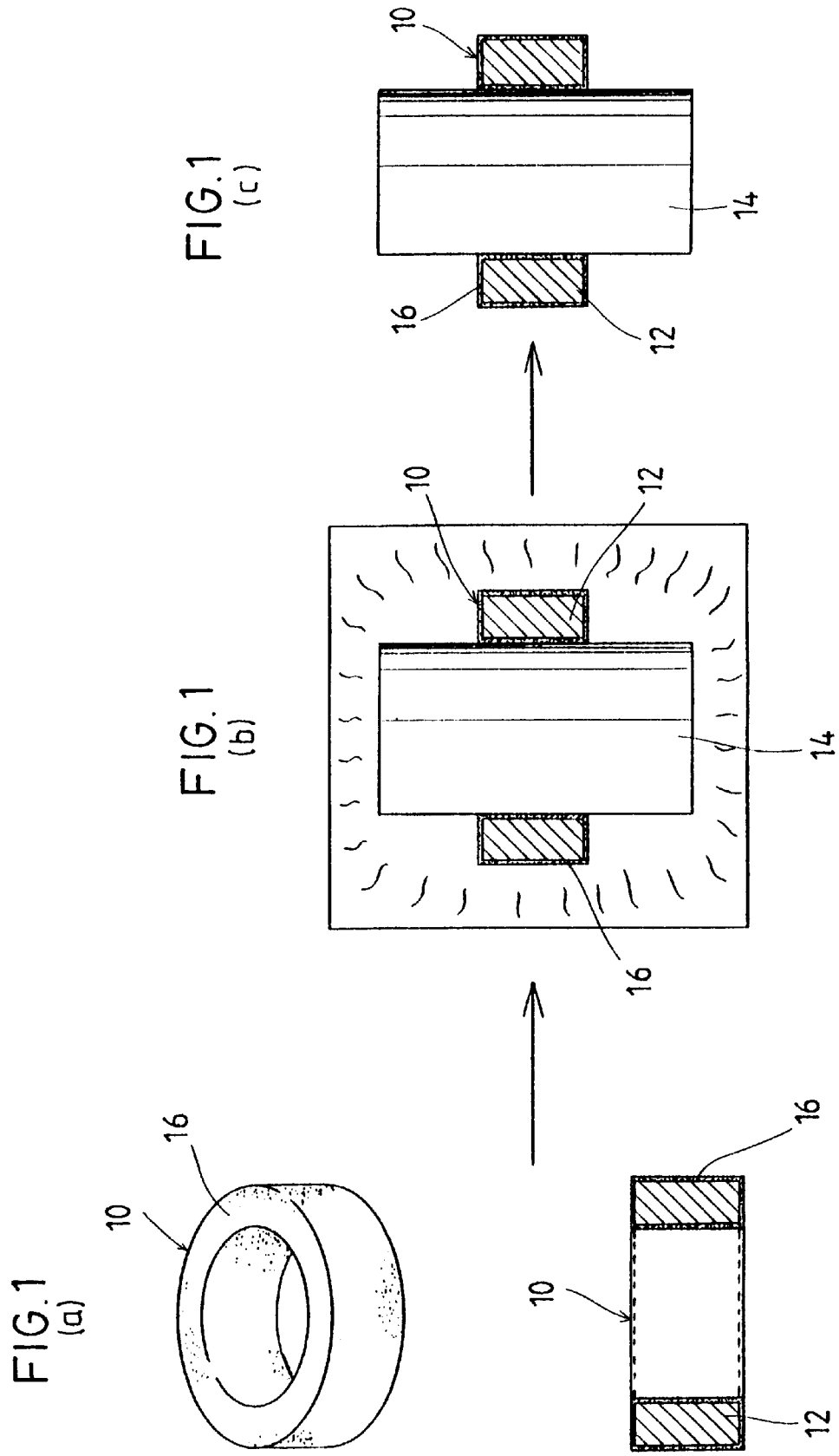
FIG. 1 is an illustration showing the assembly structure of the rotor in the stepping motor according to one embodiment of the present invention.

Next, the product bonded with resin paint and the process of bonding in accordance with the present invention will be described hereinafter referring to the attached drawings of the preferred embodiment. In the illustrated embodiment, the one of the parts is a ring magnet or segment magnet made of the magnetic material such as neodymium-iron-boron (Nd-Fe-B), samarium-cobalt (Sm-Co), etc. and the other is a boss of nonmagnetic metal or a yoke of ferromagnetic metal. However, the present invention is not limited to such product or process employing those parts. Incidentally, the same member as one that has previously been described is given the same reference character.

Figure 8:
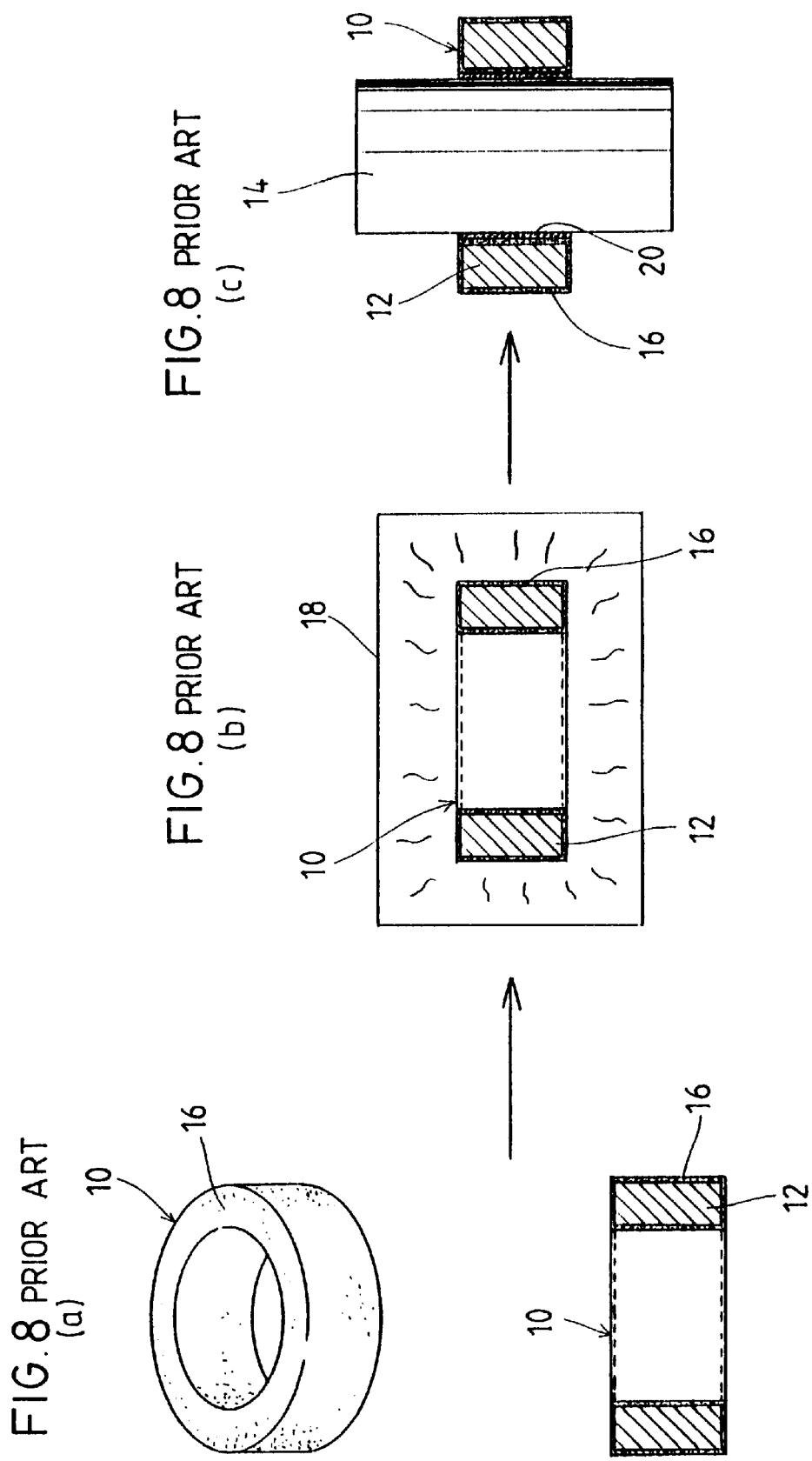
FIG. 8 is an illustration showing an assembling process of a rotor in the stepping motor.

FIG. 1 shows the assembly structure of the rotor in the stepping motor previously described in FIG. 8, and the rotor 10 is constituted by a ring 12 of the above-mentioned magnetic material and a boss 14 of nonmagnetic stainless steel, aluminium, etc. which is inserted into the ring 12. The surface of the ring 12 is applied with anti-corrosive paint 16 by the electrodepositioning painting, for instance, but at this stage the baking in the heating furnace (electric furnace, gas furnace, etc.; this is the same hereinafter) is not performed. As regards the anti-corrosive paint 16 to be used for this purpose, the resin paint having adhesive property is preferably used; for example, alkyd resin which is a kind of polyester resin, phenol resin which is obtained by binding phenol and formaldehyde, thermosetting acrylic resin which is made by combination of the unfunctional and functional monomers, epoxy resin containing epoxy rings in the molecule, polyurethane resin containing a plurality of urethane bonds in the molecule, etc. As a result of tightly inserting the above-mentioned boss 14 into the through hole of the ring 12 to which the resin paint having the adhesive property is applied on the surface, the rotor 10 is produced that is prior to the baking. Next, as a result of baking the rotor 10 in the heating furnace, not shown, the above-described resin paint 16 displays the adhesive property so that the ring 12 and boss 14 are securely bonded at the contact portion.

Figure 2:
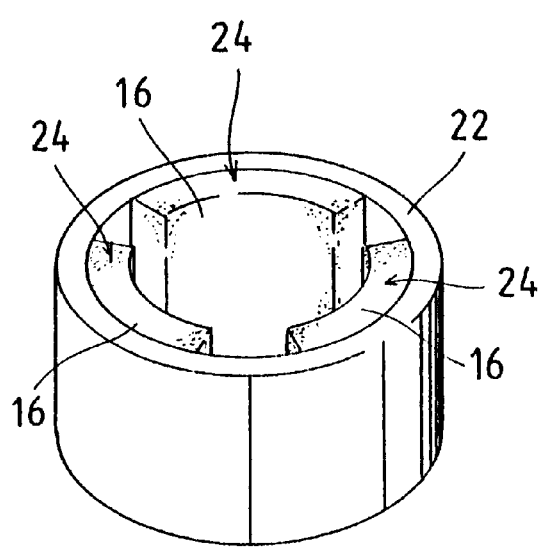
FIG. 2 is an illustration showing the assembly structure of the cylindrical yoke in the motor housing according to another embodiment of the invention.
Figure 2:
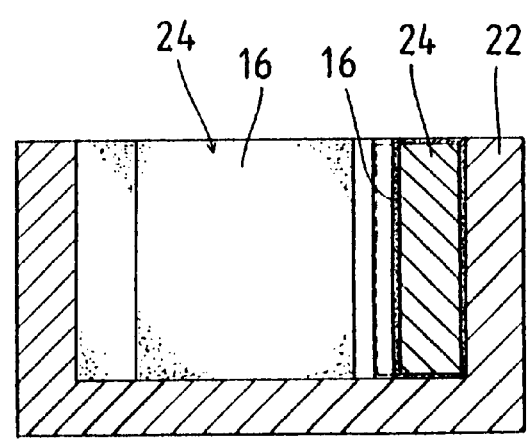
Figure 9:
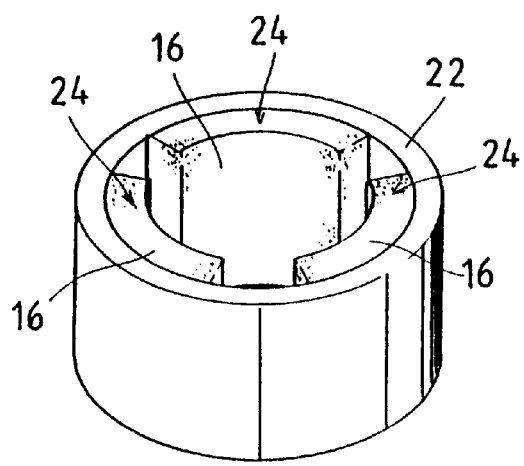
FIG. 9 is an illustration showing an assembling condition of a cylindrical yoke and a segment magnet bonded thereto in the spindle motor; in particular, (1) is a perspective view of the yoke and (2) is a vertical section of the same.
Figure 9:
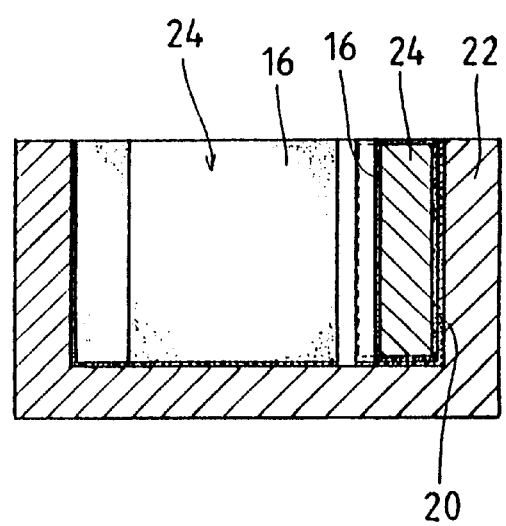

FIG. 2 shows an assembly structure of the cylindrical yoke in the motor housing previously described in FIG. 9, which is constituted by a yoke 22 and a plurality of arc pieces of segment magnets 24 bonded at predetermined intervals peripherally to the inner surface of the yoke 22. That is, the surface of each segment magnet 24 is applied with the resin paint 16 having the adhesive property by the electrodepositioning painting, etc., but at this stage the baking for the segment magnet 24 is not performed. As a result of disposing the segment magnet 24 applied with the anti-corrosive paint 16 on the predetermined location in the yoke 22, the assembly of the cylindrical yoke is obtained. Further, as a result of baking the assembly of the cylindrical yoke in the heating furnace, not shown, the above-described resin paint 16 displays the adhesive property so that the segment magnets 24 and yoke 22 are securely bonded at the contact portion.

Figure 3:
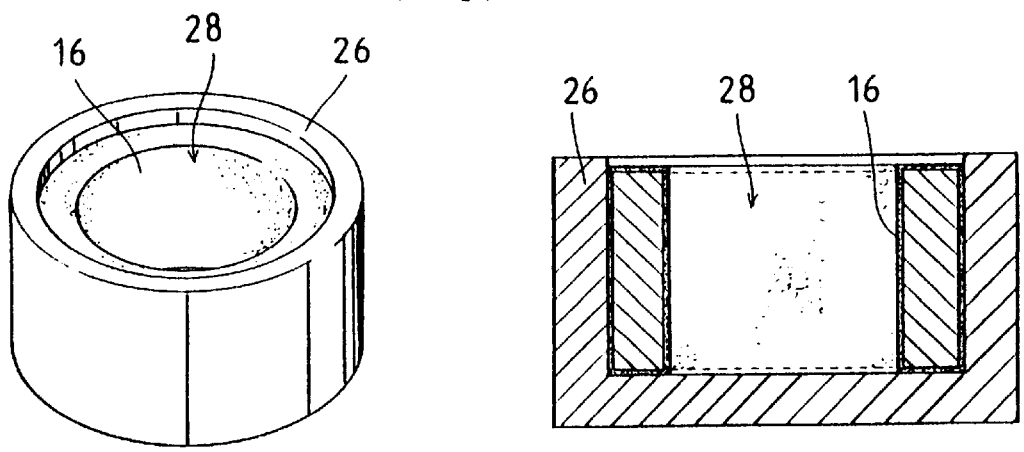
FIG. 3 is an illustration showing a housing assembly of the spindle motor according to a further embodiment of the invention.

FIG. 3 shows a spindle motor, in which a cylindrical field magnet 28 made of the magnetic material such as neodymium-iron-boron, samarium-cobalt, etc. is inserted into a housing 26 which is a ring yoke (for example an iron yoke). The surface of the cylindrical field magnet 28 is applied with the resin paint 16 having the adhesive property by the electrodepositioning painting, etc., but at this stage the baking for the cylindrical field magnet 28 is not performed. As a result of inserting the cylindrical field magnet 28 applied with the anti-corrosive paint 16 into the housing 26 to be brought into contact with inner wall of the housing tightly, the housing assembly is obtained. Further, as a result of baking the assembly of the housing, the above-described resin paint 16 displays the adhesive property so that the cylindrical field magnet 28 and the housing 26 are securely bonded at the contact portion.

Figure 4:
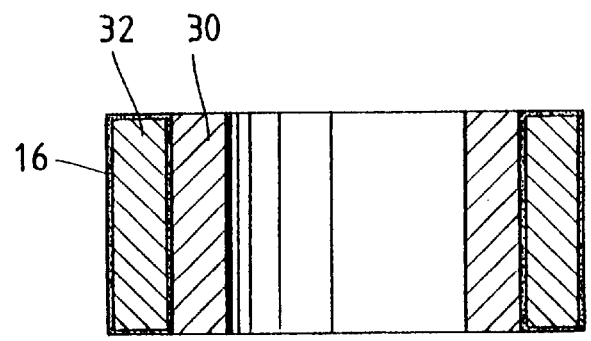
FIG. 4 is an illustration showing a rotor assembly to be used for magnetic disk drive according to another embodiment of the invention.

FIG. 4 shows a rotor assembly to be used for the magnetic disk drive, for instance. The rotor assembly is constituted by a ring 30 made of the magnetic or nonmagnetic metal and a ring magnet 32 made of the magnetic material such as neodymium-iron-boron, etc. which is inserted into the outer periphery of the ring 30. The surface of this ring magnet 32 is applied with the above-described resin paint 16 having the adhesive property by the electrodepositioning painting, etc., but at this stage the baking for the ring magnet 32 is not performed. As a result of inserting the ring magnet 32 applied with the anti-corrosive paint 16 into the outer periphery of the ring 30 to be brought into contact with outer wall of the ring tightly, the rotor assembly is obtained. Further, as a result of baking the rotor assembly, the above-described resin paint 16 displays the adhesive property so that the ring magnet 32 and the ring 30 are securely bonded at the contact portion.

Figure 5:
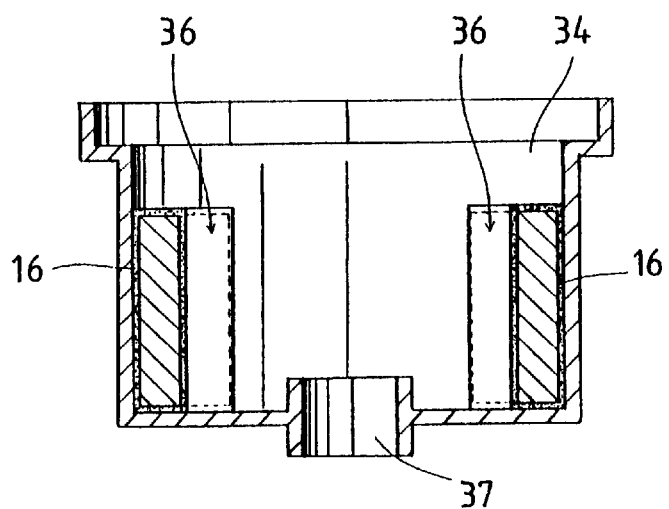
FIG. 5 is an illustration showing a housing assembly of the motor according to a further embodiment of the invention.

FIG. 5 shows a housing assembly of the motor in accordance with another embodiment, in which a plurality of segment field magnets 36 made of the magnetic material such as neodymium-iron-boron, etc. are inserted at predetermined intervals into a housing 34 made of magnetic or nonmagnetic metal. The surface of each segment field magnet 36 is applied with the above-described resin paint 16 having the adhesive property by the electrodepositioning painting, etc., but at this stage the baking for the segment field magnet 36 is not performed. As a result of inserting the segment field magnets 36 applied with the anti-corrosive paint 16 into the housing 34 to be brought into contact with inner wall of the housing tightly, the housing assembly is obtained. Further, as a result of baking the housing assembly, the above-described resin paint 16 displays the adhesive property so that the segment field magnet 36 and the housing 34 are securely bonded at the contact portion. Incidentally, the reference character 37 in the figure designates the bearing portion for fitting a bearing, not shown.

Figure 6:
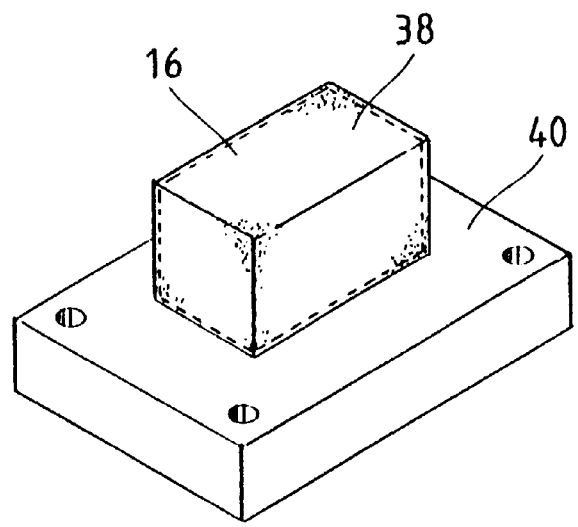
FIG. 6 is an illustration showing a magnetic sensor according to a further embodiment of the invention.

FIG. 6 shows a magnetic sensor having a magnetic element attached to a base plate; a magnetic element 38 made of magnetic material such as neodymium-iron-boron, samarium-cobalt, etc. is bonded on a base plate 40 in the predetermined dimensions. That is, the surface of the magnetic element 38 is applied with the above-described resin paint 16 having the adhesive property by the electrodepositioning painting, etc., but at this stage the baking for the magnetic element 38 is not performed. The magnetic element 38 applied with the anti-corrosive paint 16 is placed in the appropriate position on the surface of the base plate. Further, as a result of baking the magnetic sensor, the above-described resin paint 16 displays the adhesive property so that the magnetic element 38 and the base plate 40 are securely bonded at the contact portion.

Figure 7:
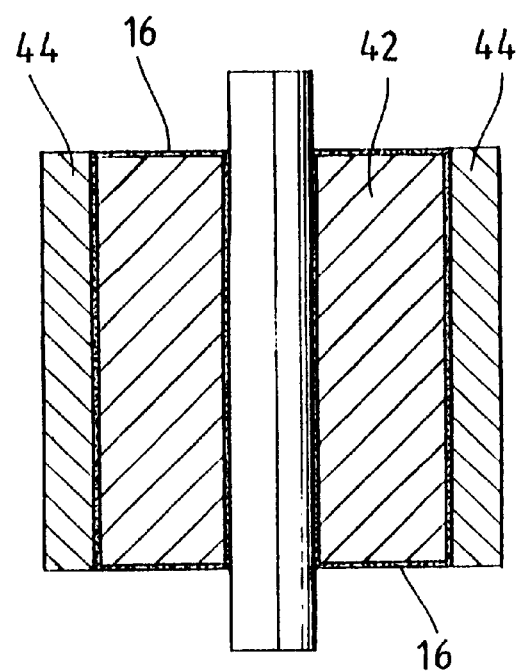
FIG. 7 is an illustrations showing a rotor to be used for the generator according to a further embodiment of the invention.

FIG. 7 shown an example of a rotor assembly used in the generator, and the rotor assembly is constituted by a rotor 42 made of alnico cast magnet and a piece of the yoke 44 made of ferromagnetic material which is bonded to the surface of the rotor 42. That is, the surfaces on four sides of the rotor 42 are made the notched flat surfaces, and applied with the above-described resin paint 16 having the adhesive property by the electrodepositioning painting, etc., but at this stage the baking for the rotor 42 is not performed. The piece of the yoke 44 is placed in the appropriate position on the flat surface of the rotor 42 applied with the anti-corrosive paint 16. Further, as a result of baking the generator body, the above-described resin paint 16 displays the adhesive property so that the rotor 42 and the piece of the yoke 44 are securely bonded at the contact portion.

What is claimed is:

1. A process of bonding together two or more parts for use in a motor with anticorrosive resin paint comprising the steps of: applying said anticorrosive resin paint having an adhesive property to one of two or more parts of a motor to be bonded together so that an entire surface of said at least one of said two or more parts of said motor is covered by said anticorrosive resin paint which forms an anticorrosive film on said entire surface, wherein one of said two parts of said motor is made of magnetic metallic material and other of said two or more parts of said motor are made of nonmagnetic or soft magnetic metallic material, assembling said painted two or more parts of said motor in contact with each other, and baking said assembled two or more parts of said motor so that the contact portions between said two or more parts of said motor are bonded and prevented from rusting by adhesion of said anticorrosive paint only.

2. A process as set forth in claim 1, wherein the one part to which said anticorrosive paint is applied is made of magnetic material, and the other part with which the painted part is brought into contact is made of nonmagnetic, soft magnetic, or ferromagnetic metal.

3. A process as set forth in claim 1 or 2, wherein said resin employed as said anticorrosive paint is selected from the group consisting of alkyd, phenolic, acrylic, epoxy, and polyurethane.

4. A product for a motor comprising one or more first parts of a motor, which are made of a magnetic metallic material, having an entire surface thereof covered by anticorrosive resin paint, and one or more second parts of said motor, which are made of non-magnetic or soft magnetic metallic material, and said first and second parts of said motor are bonded together by baking said anticorrosive resin paint to form said product.

5. A product for a motor as set forth in claim 4, wherein said anticorrosive paint is selected from the group consisting of alkyd, phenolic, acrylic, epoxy, and polyurethane.

* * * * *